(12) United States Patent
Fukushi (10) Patent No.: US 6,759,129 B2
(45) Date of Patent: Jul. 6, 2004

(54) ADHESION AND BONDING OF MULTI-LAYER ARTICLES INCLUDING A FLUOROPOLYMER LAYER

(75) Inventor: Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/126,117

(22) Filed: Apr. 18, 2002

(65) Prior Publication Data

US 2003/0207118 A1 Nov. 6, 2003

(51) Int. Cl.[7] .............................................. B32B 27/36
(52) U.S. Cl. ..................... 428/412; 428/421; 428/423.1; 428/457; 428/474.4; 428/521; 428/522; 428/523; 156/333
(58) Field of Search .................. 156/333; 428/355 EN, 428/413, 421, 423.1, 457, 474.4, 521, 502, 523

(56) References Cited

U.S. PATENT DOCUMENTS

| | | | |
|---|---|---|---|
| 2,789,063 A | 4/1957 | Purvis et al. ............... 427/302 |
| 3,418,302 A | 12/1968 | Darby ......................... 526/247 |
| 3,484,503 A | 12/1969 | Magner et al. ............. 525/200 |
| 3,987,126 A | 10/1976 | Brodoway .................. 525/200 |
| 4,148,982 A | 4/1979 | Morozumi et al. | |
| 4,214,060 A | 7/1980 | Apotheker et al. ......... 525/387 |
| 4,252,858 A | * 2/1981 | Chao et al. ................. 428/421 |
| 4,260,698 A | 4/1981 | Tatemoto et al. ........... 525/102 |
| 4,287,322 A | 9/1981 | Worm ........................ 525/403 |
| 4,338,237 A | 7/1982 | Sulzbach et al. ........... 524/777 |
| 4,413,094 A | 11/1983 | Aufdermarsh, Jr. ......... 525/187 |
| 4,463,144 A | 7/1984 | Kojima et al. .............. 526/94 |
| 4,530,970 A | 7/1985 | Morozumi et al. ......... 525/193 |
| 4,555,543 A | 11/1985 | Effenberger et al. ........ 524/520 |
| 4,560,737 A | 12/1985 | Yamamoto et al. ........... 527/72 |
| 4,600,651 A | 7/1986 | Aufdermarsh et al. | |
| 4,647,413 A | 3/1987 | Savu ........................... 562/850 |
| 4,659,625 A | 4/1987 | Decroly et al. ............. 428/412 |
| 4,713,418 A | 12/1987 | Logothetis et al. ......... 525/200 |
| 4,745,165 A | 5/1988 | Arcella et al. .............. 526/247 |
| 4,749,752 A | 6/1988 | Youlu et al. ................ 525/199 |
| 4,886,689 A | 12/1989 | Kotliar et al. ............. 428/35.7 |
| 4,897,457 A | 1/1990 | Nakamura et al. .......... 526/247 |
| 4,910,276 A | 3/1990 | Nakamura et al. .......... 526/247 |
| 4,935,467 A | 6/1990 | Cheng et al. ................ 525/199 |
| 5,006,594 A | 4/1991 | Rees ........................... 524/520 |
| 5,051,479 A | 9/1991 | Logothetis et al. ......... 525/197 |

(List continued on next page.)

FOREIGN PATENT DOCUMENTS

| | | |
|---|---|---|
| EP | 1 039 199 A2 | 9/2000 |
| JP | 52-086442 | 7/1977 |
| JP | s60-23701 | 6/1985 |
| JP | 09/176425 | 7/1997 |
| WO | WO 98/08679 | 3/1998 |
| WO | WO 01/98405 | 12/2001 |
| WO | WO 02/00741 | 1/2002 |
| WO | WO 02/14065 | 2/2002 |
| WO | WO 02/14066 | 2/2002 |
| WO | WO 02/16111 | 2/2002 |
| WO | WO 02/16131 | 2/2002 |
| WO | WO 03/37621 A2 | 5/2003 |

OTHER PUBLICATIONS

*Macromolecules*, 2001, 34, "Miscibility Study in Fluorinated Tetrafluoroethylene Copolymer–Copolymer Blends", Pucciariello & Villain, pp. 1764–1771, Feb. 2001.

*Macromolecules*, 2000, 36, "Melt–Processable Poly(tetrafluoroethylene)", Tervoort, Visjager, Graff & Smith, pp. 6460–6465, Jul. 2000.

(List continued on next page.)

Primary Examiner—Ramsey Zacharia
(74) Attorney, Agent, or Firm—Dean M. Harts (57) ABSTRACT

A multi-layer article includes a first polymer layer, a substrate, and a bonding layer on a surface of the first polymer layer and in contact with the substrate.

23 Claims, 5 Drawing Sheets

U.S. PATENT DOCUMENTS

| | | | |
|---|---|---|---|
| 5,057,345 A | 10/1991 | Barrett | 428/35.1 |
| 5,109,071 A | 4/1992 | Johnson et al. | 525/199 |
| 5,141,800 A | 8/1992 | Effenberger et al. | 428/267 |
| 5,170,011 A | 12/1992 | Martucci | 174/47 |
| 5,192,476 A | 3/1993 | Green | 264/127 |
| 5,240,775 A | 8/1993 | Tannenbaum | 429/422 |
| 5,252,401 A | 10/1993 | Kitto et al. | 428/422 |
| 5,285,002 A | 2/1994 | Grootaert | 526/222 |
| 5,354,811 A | 10/1994 | Kamiya et al. | 525/200 |
| 5,383,087 A | 1/1995 | Noone et al. | 361/215 |
| 5,427,831 A | 6/1995 | Stevens | 428/36.2 |
| 5,476,080 A | 12/1995 | Brunnhofer | 123/468 |
| 5,512,225 A | 4/1996 | Fukushi | 264/127 |
| 5,552,199 A | 9/1996 | Blong et al. | 428/36.9 |
| 5,554,425 A | 9/1996 | Krause et al. | 428/36.91 |
| 5,566,570 A | 10/1996 | Hankel et al. | 73/159 |
| 5,566,720 A | 10/1996 | Cheney et al. | 138/137 |
| 5,573,039 A | 11/1996 | Mang | 138/141 |
| 5,613,524 A | 3/1997 | Martucci | 138/137 |
| 5,626,930 A | 5/1997 | Fukushi | 428/36.9 |
| RE35,527 E | 6/1997 | Martucci | 174/47 |
| 5,653,266 A | 8/1997 | Reynolds et al. | 138/137 |
| 5,655,572 A | 8/1997 | Marena | 138/125 |
| 5,656,121 A | 8/1997 | Fukushi | 156/326 |
| 5,658,670 A | 8/1997 | Fukushi et al. | 428/421 |
| 5,658,671 A | 8/1997 | Fukushi | 428/421 |
| 5,733,981 A | 3/1998 | Coggio et al. | 525/326.2 |
| 5,741,855 A | 4/1998 | Kaduk et al. | 525/88 |
| 5,827,587 A | 10/1998 | Fukushi | 428/36.6 |
| 5,855,977 A | 1/1999 | Fukushi et al. | 428/136.6 |
| 5,908,704 A | 6/1999 | Friedman et al. | |
| 5,916,659 A | 6/1999 | Koerber et al. | 428/86 |
| 5,931,201 A | 8/1999 | Hsich | 138/137 |
| 5,934,336 A | 8/1999 | Hsich | 138/137 |
| 5,960,977 A | 10/1999 | Ostrander et al. | 220/86.1 |
| 5,974,649 A | 11/1999 | Marena | 29/458 |
| 6,012,496 A | 1/2000 | Hsich et al. | 138/137 |
| 6,039,084 A | 3/2000 | Martucci et al. | 138/137 |
| 6,039,085 A | 3/2000 | Hsich | 138/137 |
| 6,074,719 A | 6/2000 | Fukushi et al. | 428/36.9 |
| 6,077,609 A | 6/2000 | Blong et al. | 428/412 |
| 6,080,487 A | 6/2000 | Coggio et al. | 428/422 |
| 6,117,508 A | 9/2000 | Parsonage et al. | 428/36.91 |
| 6,155,304 A | 12/2000 | Hsich et al. | 138/137 |
| 6,176,268 B1 | 1/2001 | Hsich et al. | 138/137 |
| 6,180,176 B1 * | 1/2001 | Gledhill et al. | 427/387 |
| 6,192,942 B1 | 2/2001 | Hsich et al. | 138/137 |
| 6,194,050 B1 | 2/2001 | Koerber et al. | 428/86 |
| 6,197,393 B1 | 3/2001 | Jing et al. | 428/35.9 |
| 6,203,873 B1 | 3/2001 | Shifman et al. | 428/36.8 |
| 6,257,280 B1 | 7/2001 | Marena | 138/125 |
| 6,263,920 B1 | 7/2001 | Hsich et al. | 138/137 |
| 6,270,901 B1 | 8/2001 | Parsonage et al. | 428/421 |
| 6,310,141 B1 | 10/2001 | Chen et al. | 525/199 |
| 6,346,328 B1 | 2/2002 | Parsonage et al. | 428/412 |
| 6,361,641 B1 | 3/2002 | Blong et al. | 156/243 |
| 2001/0034414 A1 | 10/2001 | Effenberger et al. | 525/199 |
| 2002/0003441 A1 | 1/2002 | Steensgaard-Madsen | 327/54 |
| 2003/0008151 A1 | 1/2003 | Araki et al. | |

OTHER PUBLICATIONS

*Fluoroplastics: Non–Melt Processible Fluoroplastics: The Definitive User's Guide and Databook*, "Fluoropolymers: Properties and Structure", Feb. 2000, pp. 23–32.

*Journal of Polymer Science: Part B: Polymer Physics*, vol. 37, 1999 John Wiley & Sons, Inc., "Phase Behavior of Crystalline Blends of Poly(tetrafluoroethylene) and of Random Fluorinated Copolymers of Tetrafluoroethylene", pp. 679–689.

*Modern Fluoropolymers*, John Wiley and Sons, Chapter 7, "Adhesion Properties of Fluoropolymers", D.M. Brewis and I. Mathieson, pp. 165–172 (1997).

*Journal Adhesion*, 41, "Adhesion Studies of Fluoropolymers", D.M. Brewis, I. Mathieson and I. Sutherland, pp. 113–128 (1993).

*Science*, F.S. Bates, vol 288, pp 2187–2190, Jun. 2000.

*SPI Fluoropolymer Fall Conference*, Oct. 1–3, 1995, "Fluoropolymer Cladding of Non–Fluoropolymeric Materials", John A. Effenberger–Chemfab.

* cited by examiner

ADHESION AND BONDING OF MULTI-LAYER ARTICLES INCLUDING A FLUOROPOLYMER LAYER

TECHNICAL FIELD

This invention relates to a multi-layer article having a fluoroelastomer layer and a barrier layer, and a method of making the multi-layer article.

BACKGROUND

Fluorine-containing polymers (also known as "fluoropolymers") are a commercially useful class of materials. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Such constructions find utility, for example, in fuel line hoses and related containers and hoses or gaskets in the chemical processing field. Adhesion between the layers of a multi-layered article may need to meet various performance standards depending on the use of the finished article. However, it is often difficult to establish high bond strengths when one or more of the layers is a fluoropolymer, in part, because of the non-adhesive qualities of fluoropolymers. Various methods have been proposed to address this problem. One approach is to use an adhesive layer or tie layer between the fluoropolymer layer and the second polymer layer. Surface treatments for the fluoropolymer layer, including the use of powerful reducing agents (e.g., sodium naphthalide) and corona discharge, have also been employed to enhance adhesion. In the case of fluoropolymers containing interpolymerized units derived from vinylidene fluoride, exposure of the fluoropolymer to a dehydrofluorinating agent such as a base has been used, as well as polyamine reagents applied to the fluoropolymer surface or incorporated within the fluoropolymer itself. A need still exists for simple, effective means to bond to fluoropolymer containing materials, particularly in a multi-layer constructions.

SUMMARY

In one aspect, a multi-layer article includes a first polymer layer, a substrate, and a bonding layer on a surface of the first polymer layer and in contact with the substrate. The first polymer layer includes a fluoropolymer. The fluoropolymer can be a fluoroplastic. The bonding layer includes a fluoroelastomer, wherein the fluoroelastomer comprises a monomer segment derived from an olefinic hydrocarbon.

In another aspect, a process for preparing a multi-layer article includes providing a first polymer layer, providing a substrate, providing a bonding layer on a surface of the first polymer layer and in contact with the substrate, and heating the first polymer layer and the bonding layer. The first polymer layer includes a fluoropolymer. The bonding layer includes a fluoroelastomer.

The fluoroelastomer can be a copolymer. In addition to the olefinic hydrocarbon monomer, the copolymer can be derived from fluorinated monomers including, for example, tetrafluoroethylene, vinylidene fluoride, hexafluoropropylene, fluorinated vinyl ethers or combinations thereof. The olefinic hydrocarbon can be propylene or ethylene. The bonding layer can include an adhesion promoter, an amino silane, an aldimine silane or a ketimine silane.

The substrate can include a metal or a non-fluorinated polymer, such as a thermoplastic polymer or a thermoplastic elastomer. The non-fluorinated polymer can be a nitrile rubber, an ethylene-propylene-diene monomer rubber, an epichlorohydrin rubber, an ethylene-acrylate copolymer rubber, a polyamide, a polyurethane, a polyolefin, or combinations thereof.

In another aspect, a multi-layer article includes a first polymer layer, a substrate, and a bonding layer on a surface of the first polymer layer and in contact with the substrate. The first polymer layer includes a fluoroplastic. The substrate can include a non-fluorinated polymer, a fluoropolymer, or a metal. The bonding layer includes an adhesion promoter and a fluoroelastomer derived from at least a fluorinated monomer and an olefinic hydrocarbon.

The bonding layer fluoroelastomer provides not only excellent adhesion to the fluoropolymer and substrates, but can also improve sealing of connector parts, joints or gaskets and can increase the amount of force needed to separate the fluoroplastic inner layer and connector parts or joints.

Improved adhesion between a fluoropolymer layer and a second layer can arise from coating the fluoropolymer layer and/or the second layer with a fluoroelastomer solution. Fluoroelastomer solution can provide excellent adhesion between the fluoropolymers and substrates such as metal and can improve the sealing from connector parts or joints or gaskets. Excellent interlayer adhesion of fluorine-containing polymer such as copolymer of ethylene and tetrafluoroethylene (ETFE) and a terpolymer of tetrafluoroethylene, hexafluoropropylene and vinylidene fluoride (THV) to metallic substrates such as stainless steel can be obtained. The multi-layer compositions can have unexpected improved interlayer adhesion and sealing or pull-off force between the fluoroplastic inner layer and connector parts.

Other features, objects, and advantages of the invention will be apparent from the description and drawings, and from the claims.

DETAILED DESCRIPTION

Figure 1:
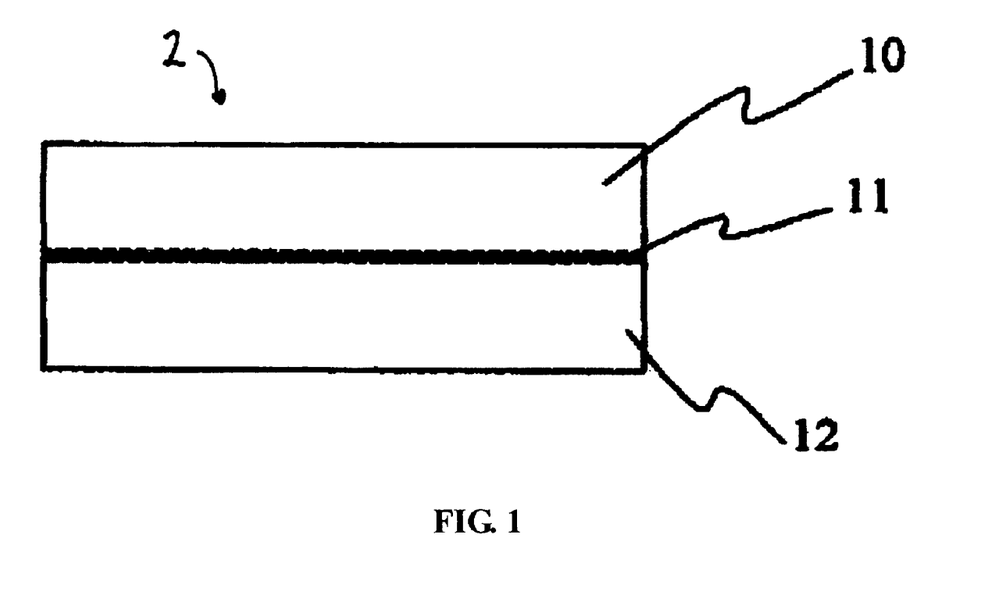
FIG. 1 is a cross-sectional view of a multi-layer article.

Adhesion between a fluoropolymer and a substrate is improved by a bonding layer including a fluoroelastomer or fluoroelastomer solution. The fluoroelastomer can include a terpolymer of vinylidene fluoride, tetrafluoroethylene and propylene. The adhered layers can form a multi-layer article. Referring to FIG. 1, multi-layer article 2 includes fluoropolymer 10 contacting bonding layer 11, which in turn contacts substrate 12. The bonding layer 11 can be a fluoroelastomer solution coated onto either the substrate 12 or fluoropolymer layer 10. After removing solvent from the bonding layer 11, the fluoroelastomer coated substrate 12 or fluoropolymer layer 10 can be covered by or laminated with the other of fluoropolymer layer 10 or substrate 12 to form multi-layer article 2.

Figure 2:
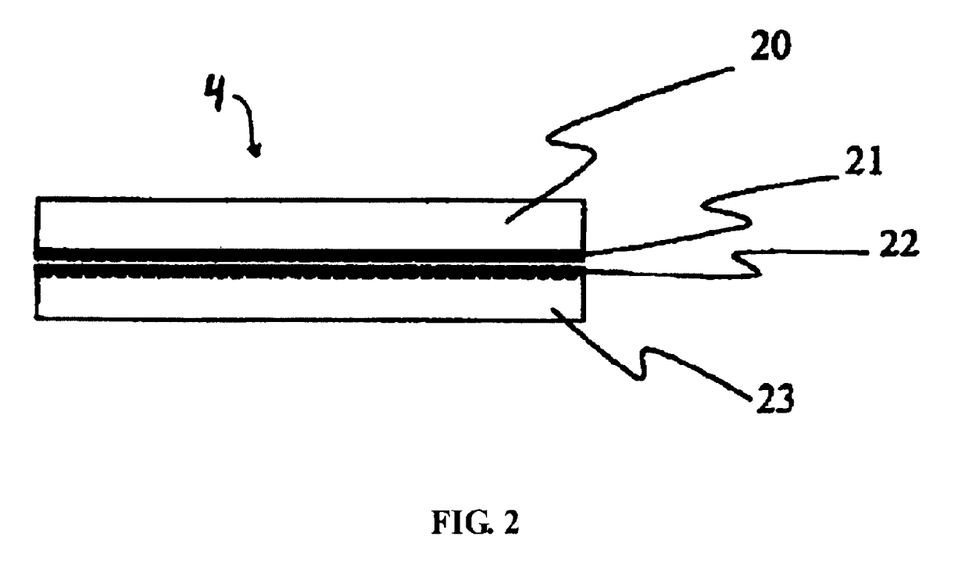
FIG. 2 is a cross-sectional view of a multi-layer article.

Referring to FIG. 2, multi-layer article 4 includes bonding layers 21, 22, each of which included a fluoroelastomer solution, are coated onto a fluoropolymer layer 20 and onto a substrate 23. After removing solvent from each of layers 21, 22, the layers 21, 22 are contacted to form the multi-layer laminate 4.

Figure 3:
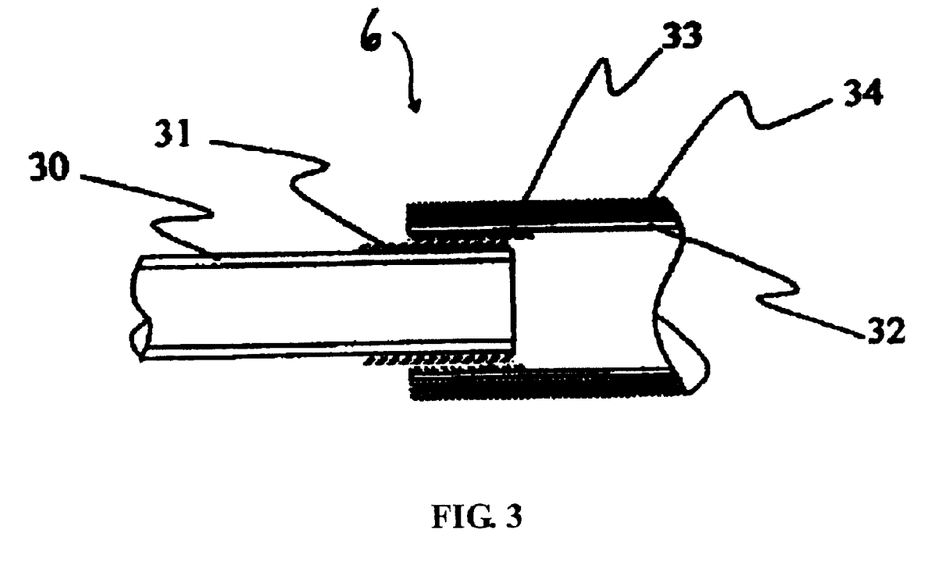
FIG. 3 is a cross-sectional view of a multi-layer article.

Referring to FIG. 3, multi-layer article 6 includes bonding layer 31 coated onto the outer surface of tubular substrate 30 and bonding layer 33 coated onto the inner surface of fluoropolymer tube 32. The bonding layers include a fluoroelastomer that comprises an olefinic hydrocarbon. After removing solvent from both coated layers 31, 33, the coated tubular substrate 30 is inserted into the coated fluoropolymer tube 32 to form the multi-layer article 6. Fluoropolymer tube 32 includes outer layer 34, such as ethylene-epichlorohydrin rubber or nitrile rubber.

Figure 4:
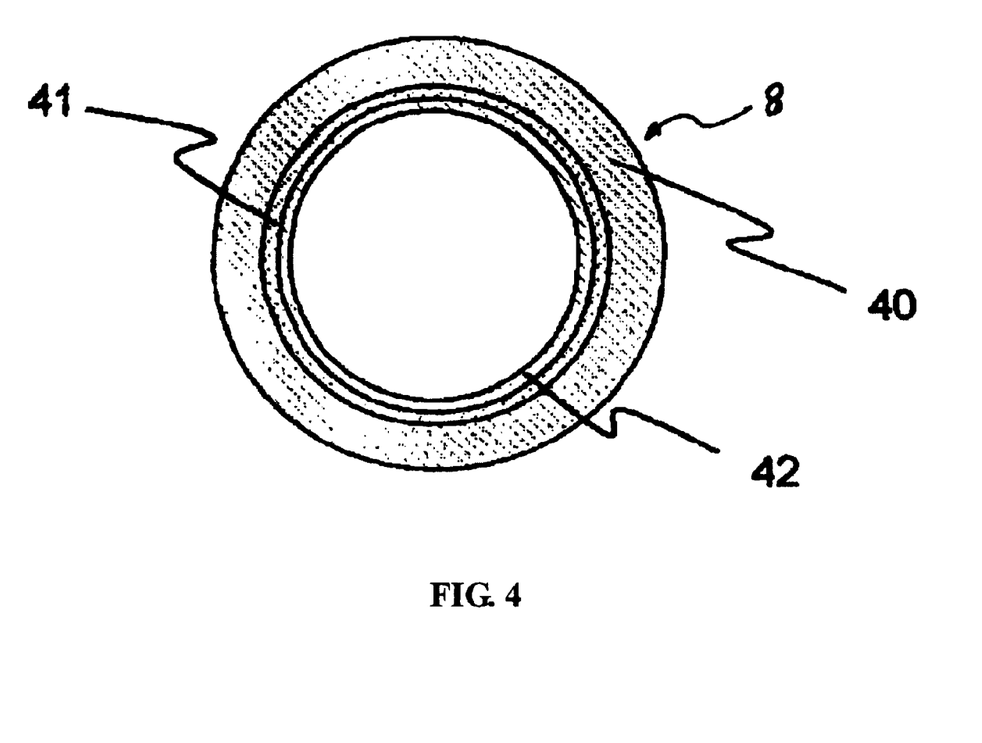
FIG. 4 is a cross-sectional view of a multi-layer article.

Referring to FIG. 4, multi-layer article 8 includes bonding layer 42, including a fluoroelastomer, as an inner surface of a tube and coating an intermediate layer 41, which is a fluorinated thermoplastic. The outer layer 40, which covers intermediate layer 41 is an elastomer, rubber, or thermoplastic elastomer layer.

Figure 5:
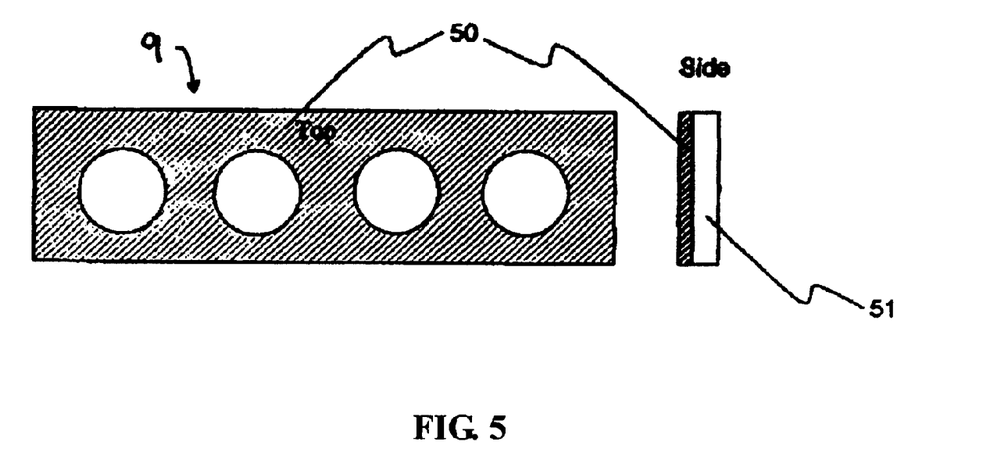
FIG. 5 is a cross-sectional view of a multi-layer article.

A gasket, such as a cylinder gasket for automobiles, can be prepared by coating a metallic substrate, such as stainless steel, with a bonding layer including a fluoroelastomer that comprises an olefinic hydrocarbon. Referring to FIG. 5, multi-layer article 9 is a gasket. Bonding layer 50, formed from a fluoroelastomer solution coated onto a metal sheet substrate 51. Substrate 51 does not require a primer prior to coating with the bonding layer 50.

In general, the multi-layer article includes a polymer layer, a substrate, and a bonding layer on a surface of the polymer layer and in contact with the substrate. The polymer layer includes a fluoropolymer.

The bonding layer is formed from a bonding composition. The bonding composition includes a fluoroelastomer that comprises an olefinic hydrocarbon. The bonding composition may include a solvent to facilitate applying a coating of the composition to a surface of the fluoropolymers or the substrate, or both. The solvent may be removed, for example, by drying, prior to contacting the substrate and polymer surfaces and prior to curing the bonding layer at an elevated temperature. The bonding composition may also comprise an aqueous dispersion of the fluoroelastomer.

The bonding composition can also include an adhesion promoter. The adhesion promoter can be an onium salt, a silane coupling agent, a sulfonamide, or a combination thereof. The silane coupling agent can be a reaction product between aldehyde or ketone and an amino-substituted organosilane. The amino-substituted organosilane may have a hydrolyzable substituent; for example, it may be a trialkoxysilane. For example, the amino-substituted organosilane may have the formula $H_2N-L-SiXX'X''$. L is a divalent straight chain C1–12 alkylene, C3–8 cycloalkylene, 3–8 membered ring heterocycloalkylene, C1–12 alkenylene, C3–8 cycloalkenylene, 3–8 membered ring heterocycloalkenylene, arylene, or heteroarylene. L is optionally substituted with C1–4 alkyl, C2–4 alkenyl, C2–4 alkynyl, C1–4 alkoxy, hydroxyl, halo, carboxyl, amino, nitro, cyano, C3–6 cycloalkyl, 3–6 membered heterocycloalkyl, monocyclic aryl, 5–6 membered ring heteroaryl, C1–4 alkylcarbonyloxy, C1–4 alkyloxycarbonyl, C1–4 alkylcarbonyl, formyl, C1–4 alkylcarbonylamino, or C1–4 aminocarbonyl. L is further optionally interrupted by —O—, —S—, —N(Rc)—, —N(Rc)—C(O)—, —N(Rc)—C(O)——O—, —O—C(O)—N(Rc)—, —N(Rc)—C(O)—N(Rd)—, —O—C(O)—, —C(O)—O—, or —O—C(O)—O—. Each of Rc and Rd, independently, is hydrogen, alkyl, alkenyl, alkynyl, alkoxy, hydroxylalkyl, hydroxyl, or haloalkyl; and each of X, X' and X" is a C1–18 alkyl, halogen, C1–8 alkoxy, C1–8 alkylcarbonyloxy, or amino group. When the amino-substituted organosilane has a hydrolyzable substituent, at least one of X, X', and X" is not alkyl. Further, any two of X, X' and X" may be joined through a covalent bond. The amino group may be an alkylamino group. Examples of amino-substituted organosilanes include 3-aminopropyltrimethoxysilane, 3-aminopropyltriethoxysilane, (aminoethylaminomethyl) phenethyltrimethoxysilane, (aminoethylaminomethyl) phenethyltriethoxysilane, N-(2-aminoethyl)-3-aminopropylmethyl-dimethoxysilane, N-(2-aminoethyl)-3-aminopropyltris(2-ethylhexoxy)silane, 6-(aminohexylaminopropyl)trimethoxysilane, 4-aminobutyltrimethoxysilane, 4-aminobutyltriethoxysilane, p-aminophenyltrimethoxysilane, 3-(1-aminopropoxy)-3,3,-dimethyl-1-propenyltrimethoxysilane, 3-aminopropyltris (methoxyethoxyethoxy)silane, 3-aminopropylmethyldiethoxysilane, 3-aminopropyltrimethoxysilane, and aminoundecyltrimethoxysilane.

Aldehyde or ketone can be used to make an aldimine or ketimine in this invention. Examples of aldehyde may have a formula where R=C1–8 alkyl, aryl or hydrogen.

Examples of aldehyde include formaldehyde, acetaldehyde, propylaldehyde, butylaldehyde and cinnamaldehyde.

Examples of ketone may have a formula where $R_1$ and $R_2$ can be the same or different and are C1–8 alkyl or aryl.

Examples of ketone include 1-butanone (MEK), acetone, cyclohexanone, 4-methyl-2-pentanone (MIBK), acetophenone.

The aldoimine silane or ketimine silane is prepared by reacting the aminosilane or polyaminosiloxane compound with the aldehyde or ketone. In the reaction, the amino group of an amino silane or polyaminosiloxane compound may react, for example, with a ketone as follows:

Examples of useful aldimine silane or ketimine silane include N-(1,3-dimethylbutylidene)-3-(triethoxysilyl-1-propaneamine, N-cinnamilydene-3-(triethoxysilyl-1-propaneamine.

Other examples of useful aldimine silane or ketimine silane compounds are described, e.g., in Pike et al, U.S. Pat. No. 2,942,019, "Organosilicon methylidenamino Compounds and process for producing the Same," hereby incorporated by reference. Selection of an aldimine silane or ketimine silane is preferred when the stability of the bonding composition is a concern, such as when longer pot life may be a benefit.

The onium salt can be an ammonium compound, a phosphonium compound, a sulfonium compound, a sulfoxonium compound, or an iodonium compound. Examples include benzyltriphenylphosphonium chloride, benzyltributylammonium chloride, an arylammonium salt, or a triarylsulfonium chloride. Other examples of onium compounds are described, e.g., in Fukushi, U.S. Pat. No. 5,658,671, "Fluoroelastomer Coating Composition," hereby incorporated by reference.

The sulfonamide can be a fluoroaliphatic sulfonamide, such as, for example, an N-methyl fluoroalkyl sulfonamide. The fluoroalkyl moiety can be a C2–C16 fluorinated alkyl group, such as perfluorinated alkyl moiety.

Before curing, the fluoroelastomer may be processed by injection or compression molding or other methods normally associated with thermoplastics. Fluoroelastomers after curing or crosslinking may not be able to be further processed. Fluoroelastomers may also be coated out of solvent in their uncross linked form. Fluoropolymers may also be coated from an aqueous dispersion form. Examples of suitable fluoroelastomers include copolymers derived from fluorinated monomers and at least one olefinic monomer, such as TFE-propylene copolymers, TFE-VDF-propylene copolymers and the like.

The fluoroelastomer can be a curable fluoroelastomer. A curing agent can be blended with the curable elastomer to facilitate cure. Examples of useful curing agents include imidazolines, diamines, internal salts of diamines, thioureas, and polyphenol curing agents as discussed in U.S. Pat. No. 4,287,322 to Worm, incorporated herein by reference.

The fluoroelastomer can contain a halogen capable of participating in a peroxide cure reaction that can be included in the curable fluoroelastomer composition. Typically, the halogen capable of participating in a peroxide cure reaction can be bromine, iodine or chlorine. The amounts of halogen included in the fluoroelastomer can be between 0.001 and 5%, or between 0.01 and 2.5%, by weight with respect to the total weight of the fluoroelastomer. The halogen capable of participating in a peroxide cure reaction can be present along the chain or in a terminal position. Examples of useful curable monomers include $CF_2=CFBr$, $CF_2=CHBr$, $CF_2=CFCF_2I$ and $CH_2=CHCF_2CF_2Br$. See, for example, U.S. Pat. Nos. 4,745,165 and 4,214,060, each of which is incorporated herein by reference.

The fluoropolymer may be a perfluorinated polymer or a partially fluorinated polymer. For example, the fluoropolymer may be either melt-processible such as in the case of a terpolymer of tetrafluoroethylene, hexafluoropropylene and vinylidene fluoride (THV), a tetrafluoroethylene-hexafluoropropene copolymer (FEP), and other melt-processible fluoroplastics, or may be non-melt processable such as in the case of polytetrafluoroethylene (PTFE) or modified PTFE copolymers, such as a copolymer of TFE and low levels of fluorinated vinyl ethers. The fluoropolymer may also be a fluoroelastomer. In preferred embodiments, the fluoropolymer may include FEP, tetrafluoroethylene-perfluoropropyl vinyl ether copolymer (PFA), perfluoroelastomer, or mixtures thereof.

Preferably, the fluoropolymer is a material that is capable of being extruded or coated. Such fluoropolymers typically are fluoroplastics that have melting temperatures ranging from about 100 to about 330° C., more preferably from about 150 to about 270° C. Preferred fluoroplastics include interpolymerized units derived from VDF and tetrafluoroethylene and may further include interpolymerized units derived from other fluorine-containing monomers, non-fluorine-containing monomers, or a combination thereof. Examples of suitable fluorine-containing monomers include hexafluoropropylene (HFP), chlorotrifluoroethylene (CTFE), 3-chloropentafluoropropene, perfluorinated vinyl ethers (e.g., perfluoroalkoxy vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$), vinyl fluoride, and fluorine-containing di-olefins such as perfluorodiallylether and perfluoro-1,3-butadiene. Examples of suitable non-fluorine-containing monomers include olefin monomers such as ethylene, propylene, and the like.

VDF-containing fluoroplastics may be prepared using emulsion polymerization techniques as described, e.g., in Sulzbach et al., U.S. Pat. No. 4,338,237 or Grootaert, U.S. Pat. No. 5,285,002, hereby incorporated by reference. Useful commercially available VDF-containing fluoroplastics include, for example, Dyneon™ THV 200, THV 400, THV 500G, THV 610X fluoropolymers (available from Dyneon LLC, St. Paul, Minn.), KYNAR™ 740 fluoropolymer (available from Atochem North America, Philadelphia, Pa.), HYLAR™ 700 (available from Ausimont USA, Inc., Morristown, N.J.), and fluoroelastomers, such as Dyneon™ FC-2178 (available from Dyneon LLC).

A particularly useful fluoroplastic includes interpolymerized units derived from at least TFE and VDF in which the amount of VDF is at least 0.1% by weight, but less than 20% by weight. Preferably, the amount of VDF ranges from 3–15% by weight, more preferably from 10–15% by weight.

The substrate may include an inorganic substrate, such as a metal or an inorganic glass, or an organic substrate, such as a fluoropolymer or a non-fluorinated polymer. Alternatively, the substrate may be an organic-inorganic composite. The metal may be copper or stainless steel. The inorganic glass may be a silicate. The non-fluorinated polymer may be a polyamide, a polyolefin, a polyurethane, a polyester, a polyimide, a polyimide, a polystyrene, a polycarbonate, a polyketone, a polyurea, a polyacrylate, and a polymethyl methacrylate, or a mixture thereof. For example, the non-fluorinated polymer may be a non-fluorinated elastomer, such as acrylonitrile-butadiene rubber (NBR), butadiene rubber, chlorinated and chlorosulfonated polyethylene, chloroprene rubber, ethylene-propylene monomer (EPM) rubber, ethylene-propylene-diene monomer (EPDM) rubber, epichlorohydrin (ECO) rubber, polyisobutylene rubber, polyisoprene rubber, polysulfide rubber, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers include ELVAX™ available from E. I. DuPont de Nemours Co., Wilmington, Del.

Polyamides useful as the non-fluorinated polymer are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 may be used, as well as ring-containing polyamides such as nylon-6,T and nylon-6, 1. Suitable nylons include VESTAMID™ L2140, a nylon-12 available from Creanova, Inc. of Somerset, N.J. Polyether-containing polyamides, such as PEBAX™ polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, poly-caprolactone diol, poly-1,2-butylene oxide glycol, and combinations thereof. Chain extenders such as butanediol or hexanediol may also be used in the reaction. Useful commercially available urethane polymers include MORTHANE™ L424.167 (MI=9.7), PN-04 or 3429 from Morton International, Seabrook, N.H., and X-4107 from B. F. Goodrich Co., Cleveland, Ohio.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers may be prepared by conventional free radical polymerization or catalysis of such ethylenically unsaturated monomers. The degree of crystallinity of the polymer may vary. The polymer may, for example, be a semi-crystalline high density polyethylene or may be an elastomeric copolymer of ethylene and propylene. Carboxyl, anhydride, or imide functionalities may be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available, for example, as ENGAGE™ (Dow-DuPont Elastomers, Wilmington, Del.) or EXACT™ (ExxonMobil, Linden, N.J.). For example, anhydride modified polyethylene polymers are commercially available from E. I. DuPont de Nemours & Co., Wilmington, Del., under the trade designation BYNEL™ co-extrudable adhesive resins.

Useful polyacrylates and polymethacrylates include polymers of acrylic acid, methyl acrylate, ethyl acrylate, acrylamide, methacrylic acid, methyl methacrylate, ethyl methacrylate, and the like. An example of a polymethacrylate is EMAC™ (Chevron Chemical Co., Houston, Tex.).

Useful polycarbonate polymers include aliphatic polycarbonates such as polyester carbonates, polyether carbonates, and bisphenol A derived polycarbonates, and the like.

Useful polyimide polymers include polyimide polymers made from the anhydride of pyromellitic acid and 4,4'-diaminodiphenyl ether available from E. I. DuPont de Nemours and Company under the tradename KAPTON™. Variations include KAPTON™ H, KAPTON™ E and KAPTON™ V, among others.

Additional examples of useful non-fluorinated polymers, as noted above, include polyesters, polycarbonates, polyketones, and polyureas. Commercially available examples of such polymers include SELAR™ polyester (E. I. DuPont de Nemours & Co., Wilmington, Del.), LEXAN™ polycarbonate (General Electric, Pittsfield, Mass.), KADEL™ polyketone (Amoco, Chicago, Ill.), and SPECTRIM™ polyurea (Dow Chemical Co., Midland, Mich.).

Commercially available elastomers include NIPOL™ 1052 NBR (Zeon Chemical, Louisville, Ky.), HYDRIN™ C2000 epichlorohydrin-ethylene oxide rubber (Zeon Chemical, Louisville, Ky.), HYPALON™ 48 chlorosulfonated polyethylene rubber (E. I. DuPont de Nemours & Co., Wilmington, Del.), NORDEL™ EPDM (R. T. Vanderbilt Co., Inc., Norwalk, Conn.), VAMAC™ ethylene-acrylate elastomer (E. I. DuPont de Nemours & Co. Wilmington, Del.), KRYNAC™ NBR (Bayer Corp., Pittsburgh, Pa.), PERBUNAN™ NBR/PVC blend (Bayer Corp., Pittsburgh, Pa.), THERBAN™ M hydrogenated NBR (Bayer Corp., Pittsburgh, Pa.), ZETPOL™ hydrogenated NBR (Zeon Chemical, Louisville, Ky.), SANTOPRENE™ thermoplastic elastomer (Advanced Elastomer Systems, Akron, Ohio), and KELTAN™ EPDM (DSM Elastomers Americas, Addis, La.). The substrate may include a second fluoropolymer. The substrate may have one or more surface polar functionality present thereon to enhance bonding, such as, for example, an amino, carboxyl and hydroxyl functionality.

The bonding composition may be deposited on a surface of the fluoropolymer, the substrate or both. In certain embodiments, the bonding composition may be incorporated into the fluoropolymer, the substrate, or both, such that when the surfaces contact each other, the bonding composition contacts the fluoropolymer and the substrate simultaneously. The bonding composition may be incorporated into the fluoropolymer or the substrate by melt mixing or extruding a mixture including the bonding composition. Alternatively, the bonding composition may be applied to a surface of the fluoropolymer or substrate by an process such as, for example, spray coating, curtain coating, immersion coating, dip coating, and the like.

Each of the fluoropolymer and the substrate, independently, may be provided as a film or as a molded or shaped article. The fluoropolymer and substrate may be said to contact each other in the case where the bonding composition is mixed with either the fluoropolymer or the substrate. In certain situations, more than one fluoropolymer layer may contact more than one surface of the substrate. In still other situations, two substrates may contact two surfaces of a fluoropolymer.

In many cases after contact, heat, pressure, or combinations thereof, can be applied during bonding. Suitable heat sources include, but are not limited to, ovens, heated rollers, heated presses, infrared radiation sources, flame, and the like. Suitable pressure sources are well known and include presses, nip rollers, and the like. Heat is applied at a temperature and time suitable to form a bond between the substrate and the fluoropolymer. For example, the temperature may be between 40 and 300° C., between 45 and 200° C., or between 50 and 150° C.

Any or all of the individual polymer layers in the multi-layer article can further include one or more additives. Examples of useful additives include pigments, plasticizers, tackifiers, fillers, electrically conductive materials (e.g., of the type described in U.S. Pat. No. 5,552,199, incorporated herein by reference), electrically insulating materials, stabilizers, antioxidants, lubricants, processing aids, impact modifiers, viscosity modifiers, or combinations thereof.

The invention will now be described further by way of the following examples.

EXAMPLES

In the following Examples and Comparative Examples samples were prepared and properties of the samples were evaluated. All concentrations and percentages are by weight unless otherwise indicated. The fluoroelastomer gums were prepared according to the method described in U.S. Pat. No. 4,463,144, which is incorporated by reference in its entirety.

The monomer ratios of the fluoroelastomers used in the Examples are shown in Table 1. The fluoroelastomer compounds, which are used in the Examples and Comparative Examples, are summarized in Table 2 and Table 3. The monomer ratios of the fluorothermoplastics used in the Examples are summarized in Table 4. The adhesion promoters which were added to fluoroelastomer solution and used for coating to metal, are summarized in Table 5. All amounts are expressed in parts by weight, millimoles per one hundred parts by weight of rubber (mmhr), or parts by weight per one hundred parts by weight of rubber (phr). The film or sheet thickness of all the substrates is 0.2 mm unless otherwise indicated. As represented in the Tables, VDF is vinylidene fluoride, TFE is tetrafluoroethylene, P is propylene and HFP is hexafluoropropylene. The BRE-7131 X and BRE-7231X materials shown in Table 3 are olefinic hydrocarbon-containing fluoroelastomers available from Dyneon LLC of St. Paul, Minn. FE-5830Q is a fluoroelastomer that does not contain an olefinic hydrocarbon, also available from Dyneon LLC.

TABLE 1

| Fluoroelastomer gum | Mooney viscosity | Composition (wt %) | | | |
|---|---|---|---|---|---|
| | | VDF | TFE | P | HFP |
| Fluoroelastomer A | 40 | 28 | 44 | 28 | — |
| Fluoroelastomer B | 30 | 18 | 50 | 32 | — |
| Fluoroelastomer C | 30 | 62 | — | — | 38 |

TABLE 2

| | Compound number | | | | | | |
|---|---|---|---|---|---|---|---|
| | I | II | III | IV | V | VI | VII |
| Fluoroelastomer A | 100 | 100 | — | 100 | — | — | |
| Fluoroelastomer B | — | — | 100 | — | — | — | |
| Fluoroelastomer C | — | — | — | — | 100 | 100 | 100 |
| Tributyl (2-methoxy)propyl phosphonium chloride (TMOPPCl), mmhr | 2.5 | 2.5 | 2.5 | — | 2.5 | 2.5 | |
| Bisphenol AF, mmhr | 6.25 | 6.25 | 6.25 | — | 6.25 | 6.25 | |
| Fluoroaliphatic sulfonamide, mmhr | — | 1.0 | 1.0 | — | — | 1.0 | |
| Carbon black (ASTM N990), phr | 30 | 30 | 30 | 30 | 30 | 30 | 30 |
| Magnesium oxide, phr | 10 | 10 | 10 | 10 | 10 | 10 | 10 |

TABLE 3

| | Compound number | | | | |
|---|---|---|---|---|---|
| | VIII | IX | X | XI | XII |
| BRE-7131X | 100 | — | — | — | — |
| BRE-7231X | — | 100 | — | 100 | — |
| FE-5830Q | — | — | 100 | — | 100 |
| Carbon black (ASTM N990), phr | 30 | 30 | 30 | — | 12 |
| Carbon black (ASTM N762), phr | — | — | — | 13 | — |
| Conductive carbon black, phr | — | — | — | 10 | 10 |
| Calcium hydroxide, phr | 3 | 3 | 3 | 3 | 6 |
| Magnesium oxide, phr | 6 | 6 | 6 | 6 | 9 |
| Calcium oxide, phr | — | — | — | — | 4 |
| Carnauba wax, phr | — | — | — | — | 0.5 |

TABLE 4

| Fluorothermo-plastic | Melting Point (° C.) | Monomer composition, wt % | | | | |
|---|---|---|---|---|---|---|
| | | TFE | HFP | VDF | Ethylene | Propylene |
| Fluorothermo-plastic A | 203 | 62 | 22 | 16 | — | — |
| Fluorothermo-plastic B | 233 | 76 | 12 | 12 | — | — |
| Fluorothermo-plastic C | 160 | 62 | 24 | — | 14 | — |
| Fluorothermo-plastic D | 154 | 91 | — | — | — | 9 |

TABLE 5

| Adhesion promoter | Composition (%) |
|---|---|
| Adhesion promoter A | 3-aminopropyl triethoxysilane, 100% |
| Adhesion promoter B | 3-aminopropyl triethoxysilane, 50%; 2-butanon, 50% |
| Adhesion promoter C | Condensed material of N-(1,3-dimethylbutyl-idene)-3-(triethoxysilyl-1-propaneamine (monomer, 24%; dimer, 39%; trimer, 37%) |

Example 1

The fluoroelastomer gum, Fluoroelastomer A in the Table 1, and ingredients used in each composition were compounded on a two roll mill using standard methods. Tributyl (2-methoxy)propylphosphonium chloride (TBMOPPCl), an organo-onium vulcanization accelerator, was prepared by reacting tributylphosphine and allylchloride in methanol at 60 degrees C. to 80 degrees C. for 6 to 8 hours. A polyhydroxy crosslinking agent (bisphenol AF, commercially available from Central Glass), magnesium oxide (available as Kyowa Mag #30 from Kyowa Chemical), and carbon black (available as Thermax MT3, ASTM N990 from Cancarb) were combined with the other ingredients. The compositions of the compounded gums are summarized in Table 2.

The cure rheology of the samples was investigated by testing uncured, compounded mixtures using the Alpha Technology Oscillating Disk Rheometer (ODR) Model 2000 and the procedure described in ASTM D 2084-82. All samples exhibited good curing properties.

The fluoroelastomer coating solution was made by dissolving 30% solid Compound I in 2-butanone. The fluoroelastomer solution was coated, using a notch bar, onto a sheet of 0.2 mm thick film of ETFE, a copolymer of ethylene and tetrafluoroethylene (ET 6325J, available from Dyneon LLC). The coated sheet was allowed to dry at 120 degrees C. for 10 minute. A 2 mm thick sheet of Compound I in Table 2 was applied to the fluoroelastomer solution coated side of the ETFE and the composite was heated under pressure press at 180 degrees C. for 10 minutes to evaluate the adhesion between the coating and ETFE film. The sample had the geometry shown in FIG. 1. The sample was removed from the press and allowed to cool to room temperature.

The resulting sample was cut into three 25.4 mm wide stripes. Peel or adhesion strength was measured on the three strips in accordance with ASTM D 1876 (T-peel test). To facilitate testing of the adhesion between the layers via a T-peel test, a sheet of 0.05 mm thick polyester (PET) was inserted before pressing about 2.54 cm between the fluoroelastomer coated sample and the Compound I sheet. A Monsanto Tensometer 10 at 100 mm/min crosshead speed was used as test device. The peel strength results are shown in Table 6.

Examples 2 and 3

In Examples 2 and 3, samples were prepared and tested as in Example 1, except that a fluoroaliphatic sulfonamide, $C_8F_{17}SO_2NHCH_3$, was added to the compound. The amounts of the fluoroaliphatic sulfonamide and peel strength results are summarized in Table 6. As in Example 1, both the 2 mm sheet and the coating solution contain all of the ingredients listed in Table 2 for the respective examples.

Example 4

In Example 4, a sample was prepared and tested as in Example 3 except different olefin monomer content of fluoroelastomer. Fluoroelastomer B of Table 1 was used instead of Fluoroelastomer A. The peel strength results are shown in Table 6.

Comparative Example A

In Comparative Example A, a sample was prepared and tested as in Example 1, except Fluoroelastomer C, which contains no olefin monomer, was used instead of Fluoroelastomer A. The monomer ratio of Fluoroelastomer C is shown in Table 1. The peel strength results are shown in Table 6.

Comparative Example B

In Comparative Example B, a sample was prepared and tested as in Example 2 except Fluoroelastomer C, which contains no olefin monomer, was used instead of Fluoroelastomer A. The monomer ratio of Fluoroelastomer C is shown in Table 1. The peel strength results are shown in Table 6.

TABLE 6

| Example | Coating composition | | | Peel strength (N/cm) |
|---|---|---|---|---|
| | Compound number from Table 2 | Olefin monomer content of fluoroelastomer (mol %) | Fluoroaliphatic sulfonamide (mmhr) | |
| 1 | I | 28 | — | 5.8 |
| 2 | II | 28 | 0.5 | 8.9 |
| 3 | III | 28 | 1.0 | 7.7 |
| 4 | IV | 32 | 1.0 | 5.4 |
| A | V | 0 | — | 1.2 |
| B | VI | 0 | 1.0 | 0.8 |

Substantially improved adhesion between an ETFE layer and a fluoroelastomer layer can be obtained if the fluoroelastomer contains an olefin monomer.

Example 5

In Example 5, a sample was prepared and tested as in Example 1 except that film of THV 500G, a terpolymer of TFE, HFP and VDF available from Dyneon, LLC, was used for substrate instead of ETFE film. The peel strength results are included in Table 7.

Example 6

In Example 6, a sample was prepared and tested as in Example 2 except different substrates were used for Examples as listed in Table 7. In Example 7, THV X 610 G, melting point 185° C., available from Dyneon, LLC, was used. In Example 8, a film of Fluorothermoplastic A (Table 4) was used. In Example 9, a film of Fluorothermoplastic C (Table 4) was used. In Example 10, a film of Fluorothermoplastic D (Table 4) was used. KF-1100, PVDF (polyvinylidene fluoride) available from Kureha, was also used. The peel strength results are shown in Table 7.

Examples 7–11

In Examples 7–11, samples were prepared and tested as in Example 2 except different substrates were used for Examples as listed in Table 7. In Example 7, THV X 610 G, melting point 185° C., available from Dyneon, LLC, was used. In Example 8, a film of Fluorothermoplastic D (Table 4) was used. KF-1100, PVDF (polyvinylidene fluoride) available from Kureha, was also used. The peel strength results are shown in Table 7.

Example 12

In Example 12, a sample was prepared and tested as in Example 2 except that a film of polyamide 12 (PA 12), Grilamide L25W40X, available from EMS-chemie, was used as the substrate. The peel strength results are summarized in Table 7.

Comparative Examples C and D

In Comparative Examples C and D, the samples were prepared and tested as in Example 5 and 6 respectively except that Fluoroelastomer C, which contains no olefin monomer, was used instead of Fluoroelastomer A. Compound V and compound VI were used for Comparative Example C and D respectively. The peel strength results are shown in Table 7.

Comparative Example E

In Comparative Example E, the sample was prepared and tested as in Example 12 except that Fluoroelastomer C, which contains no olefin monomer, was used in stead of Fluoroelastomer A. Compound VI was used as the fluoroelastomer compound. The peel results are shown in Table 7.

Comparative Examples F and G

In Comparative Examples F and G, the samples were prepared and tested as in Example 2 except that a FEP 6307 film, a copolymer of tetrafluoroethylene and hexafluoropropylene (perfluoroplastic, no hydrogen-containing polymer, available from Dyneon LLC) and a skived polytetrafluoroethylene film (perfluoroplastic, no hydrogen-containing polymer, available from Dyneon LLC as TF 1750) were used for substrates, respectively. The peel strength results are shown Table 7.

TABLE 7

| Example | Substrate | Coating composition Olefin monomer in FKM | Coating composition Fluoroaliphatic sulfonamide (mmhr) | Peel strength (N/cm) |
|---|---|---|---|---|
| 5 | THV 500 | Yes | — | 8.9 |
| 6 | THV 500 | Yes | 1.0 | 15.0 |
| 7 | THV X 610 | Yes | 1.0 | 8.1 |
| 8 | Fluorothermoplastic A | Yes | 1.0 | 10.0 |
| 9 | Fluorothermoplastic C | Yes | 1.0 | 6.6 |
| 10 | Fluorothermoplastic D | Yes | 1.0 | 6.6 |
| 11 | KF-1100 (PVDF) | Yes | 1.0 | 8.5 |
| 12 | PA 12 | Yes | 1.0 | 12.3 |
| C | THV 500 | No | — | 7.7 |
| D | THV 500 | No | 1.0 | 8.5 |
| E | PA 12 | No | 1.0 | 3.1 |
| F | FEP | Yes | 1.0 | 0.3 |
| G | PTFE | Yes | 1.0 | 0.1 |

An olefin monomer-containing fluoroelastomer coating is effective for improving the bonding to fluoropolymers that contain hydrogen in the polymer. Even though Comparative Examples C and D seem to have a measurable peel strength, it can be improved using a fluoropolymer comprising an olefinic hydrocarbon segment as shown in Examples 5 and 6.

Examples 13 and 14, and Comparative Example H

In Example 13 and 14, and Comparative Example H, the samples were prepared and tested as in Example 2 and 6, and Comparative Example B, respectively, except that peel strengths were tested after the samples were immersed in Fuel C (isooctane:toluene=50:50 vol %) at 23 degrees C. for 48 hours. The peel strength results are shown in Table 8.

TABLE 8

| Example | Substrate | Coating composition Olefin monomer in FKM | Peel strength (N/cm) |
|---|---|---|---|
| 13 | ETFE | Yes | 3.5 |
| 14 | THV 500 | Yes | 8.9 |
| H | ETFE | No | 0.4 |

An olefinic hydrocarbon monomer containing fluoroelastomer coating has good fuel resistance as shown in the higher peel strength values of Examples 13 and 14.

Example 15

In Example 15, a fluoroelastomer coated ETFE film was prepared and tested as in Example 2, except 2 mm thick cured fluoroelastomer sheeting, which was also coated by fluoroelastomer as the coated ETFE film, was used instead of fluoroelastomer compound. The cured sheet was prepared by press-cure of Compound I in Table 2 at 170 degrees C. for 10 minutes using mold and post-cure at 230 degrees C. for 24 hours. The sample had the geometry shown in FIG. 2. The peel strength results are shown in Table 9.

Example 16

In Example 16, the sample was prepared and tested as in Example 15, except 0.05 mm thick Kapton film, available from E. I. DuPont, was used instead of the cured fluoroelastomer sheet and a THV 500 sheet was used instead of the ETFE film. The peel strength results are shown in Table 9.

Example 17

In Example 17, the sample was prepared and tested as in Example 2, except a 1 mm thick sheet of 680 denier nylon 6 fabric was used instead of the ETFE film. The coating was applied to only one side of the fabric, and the porosity of the fabric allowed some of the coating solution to reach the uncoated side of the fabric. The peel strength results are shown in Table 9.

Comparative Example I

In Comparative Example I, the sample was prepared and tested as in Example 17, except Fluoroelastomer C, which contains no olefinic hydrocarbon monomer, was used instead of Fluoroelastomer A as a fluoroelastomer coating composition. Compound VI was used as compound of coating composition. The peel strength results are shown in Table 9.

TABLE 9

| Example | Substrate A | Substrate B | Coating composition Olefin monomer in FKM | Peel strength (N/cm) |
|---|---|---|---|---|
| 15 | ETFE | cured FKM sheet | yes | 6.9 |
| 16 | THV 500 | Kapton ™ | yes | 3.5 |
| 17 | Nylon fabric | Compound 1 | yes | 22.8 |
| L | Nylon fabric | Compound 1 | no | 0.4 |

The fluoroelastomer coating exhibits good adhesion to polyamide and polyimide.

Example 18

In Example 18, the sample was prepared and tested as in Example 1 except 1% of Adhesion Promoter A (3-aminopropyltriethoxysilane available from Witco as A-1100) was added to the coating solution and a 0.2 mm thick stainless steel 301 was used instead of ETFE film. The peel strength results are shown in Table 10.

Example 19

In Example 19, the sample was prepared and tested as in Example 2 except 1% of Adhesion Promoter A (3-aminopropyltriethoxysilane, available from Witco as A-1100) was added to the coating solution and a 0.2 mm thick stainless steel 301 was used instead of ETFE film. The peel strength results are shown in Table 10.

Example 20

In Example 20, the sample was prepared and tested as in Example 2 except 2% Adhesion Promoter B was added to the coating solution. Adhesion Promoter B was prepared by first preparing a mixture of a 50 weight percent 3-aminopropyltriethoxy silane and 50 weight percent 2-butanone and then the solution was maintained at room temperature for 24 hours. The resulting solution, which had turned to yellow, was added to the coating solution. The peel strength results are shown in Table 10.

Comparative Example J

In Comparative Example J, the sample was prepared and tested as in Example 19 except Adhesion Promoter A was not added to the coating solution. The test result is shown in Table 10.

TABLE 10

| Example | Coating solution Fluoro-aliphatic-Sulfonamide (mmhr) | Adhesion promoter to metal (%) | Peel strength (N/cm) |
|---|---|---|---|
| 18 | — | Adhesion promoter A 1.0 | 14.7 |
| 19 | 1.0 | Adhesion promoter A 1.0 | 15.8 |
| 20 | 1.0 | Adhesion promoter B 1.0 | 25.9 |
| J | 1.0 | — | 1.5 |

Substantially improved adhesion to metal substrate can be obtained if an adhesion promoter (silane coupling agent) is added to a fluoroelastomer coating solution.

The bonding composition can be used to bond to metal objects such as connectors, fittings or gaskets.

Example 21

In Example 21, the fluoroelastomer coating solution in Example 19 was coated about 30 mm from the edge of SUS 304 stainless steel pipe having an outside diameter of 12.5 mm by dipping an end of the pipe into the solution. Multiple layers of THV 500 (inside layer, 0.2 mm thickness) and ECO, a copolymer of ethylene and epichlorohydrin, (outside layer, with an inside diameter of 1.25 cm) was used for the hose sample. The fluoroelastomer solution as used in Example 2 was coated to the inside layer of the THV500/ECO hose by sucking the solution up into the hose about 30 mm from the end. Afterwards, both coated samples were allowed to dry at 120 degrees C. for 10 minutes and then post-cured at 170 degrees C. for 10 minutes. The stainless pipe was inserted into the 30 mm length of THV/ECO hose. The sample had the structure of FIG. 3. The maximum force required to separate the stainless pipe and THV/ECO hose (pull-apart test) in accordance with SAE J2044 was measured using the Tensometer 10 (available from Alpha Technology) at 50 mm/min crosshead speed. The pull apart test results are summarized in Table 11.

Example 22

In Example 23, the sample was prepared and tested as in Example 21 except the fluoroelastomer solution was not coated to the stainless pipe. The pull apart test results are summarized in Table 11.

Example 23

In Example 23, the sample was prepared and tested as in Example 21 except the fluoroelastomer solution was not coated to the THV/ECO hose. The pull apart test results are summarized in Table 11.

Comparative Example K

In Comparative Example K, the sample was prepared and tested as in Example 21 except the fluoroelastomer solution was not coated onto the stainless pipe or the inside of the THV/CO hose. The pull apart test results are summarized in Table 11.

TABLE 11

| Example | THV/ECO hose FKM coating | Stainless pipe FKM coating | Pull-apart test peak (N) |
|---|---|---|---|
| 21 | Yes | Yes | 380 |
| 22 | Yes | No | 232 |
| 23 | No | Yes | 230 |
| K | No | No | 140 |

The fluoroelastomer coating on substrates increases the amount of force needed to separate the fluoroplastic inner layer and connector parts or joints.

Example 24

The sealing property of the connection between the pipe and the THV/ECO hose was checked by monitoring leakage of pressurized nitrogen gas ($N_2$) from the joint with a regulator. The pipe and the THV/ECO hose sample were prepared as in Example 21. The stainless pipe was inserted into 30 mm length of the THV/ECO hose without clamp and then the hose was connected to the nitrogen line with a clamp. The other end of the pipe was sealed with silicon rubber. The connected the pipe and THV/ECO hose was immersed into a water bath to observe leakage from the joint. Gas leaking from the connection was measured using a 10 ml measuring cylinder with funnel in the water bath. The pressure of nitrogen gas and volume of gas leaking from the joint are summarized in the Table 12.

Comparative Example L

In Comparative Example L, the sample was prepared and tested as in Example 24 except the fluoroelastomer solution was not coated to both the stainless pipe and the THV/ECO hose. The leak results are summarized in Table 12.

TABLE 12

| Example | FKM coating | $N_2$ pressure (kPa) | Leak gas (cm$^3$/min) |
|---|---|---|---|
| 24 | Yes | 98 | No leak |
|  |  | 196 | No leak |
|  |  | 294 | No leak |
|  |  | 490 | No leak |
| L | No | 98 | 0.2 |
|  |  | 196 | 3.0 |
|  |  | 294 | pull out |
|  |  | 490 | pull out |

The fluoroelastomer coating on substrates improves the sealing of joints.

Example 25

Adhesion Promoter C was prepared by the following method: A three-neck flask equipped with a reflux tube was charged with 221.14 g (1.0 mol) of 3-aminopropyltriethoxysilane (available from Witco as A-1100). Dry nitrogen was bubbled through the liquid to displace entrapped air. 110.18 g (1.1 mol) of 4-methyl-2-pentanone (MIBK) was added dropwise to the flask and the resulting mixture was stirred at a room temperature for 30 minutes. The temperature of the contents of the flask was then increased to 90 degrees C. and held at that temperature for three hours with stirring. The mixture of a monomer, a dimer and a trimer of N-(1.4-dimethylbutylidene-3-triethoxysilyl propanamine) was obtained. The ratio of products was 24% monomer, 39% dimer, and 37% trimer, as determined by gel permeation chromatography.

The fluoroelastomer gum, Fluoroelastomer A, was compounded on a two-roll mill using standard methods. Magnesium oxide was Elastomag 170 (available from Morton International), and carbon black was Thermax MT™, ASTM N990 (available from Cancarb). The compositions of the compounded gums are summarized in Table 2.

The fluoroelastomer coating solution was made by dissolving a 32% solid of Compound IV (Table 2) in 2-butanone. The polyhydroxy crosslinking agent 2.66 g (3 mmhr) of disodium salt of 4,4'-bis(4-hydroxyphenyl)-hexafluoropropane (bisphenol AF, commercially available from Central Glass) and 5 g (16 mmhr) of the Adhesion Promoter C (described above) were mixed with the fluoroelastomer solution. The fluoroelastomer solution was coated, using a barcoater, RDS 70, onto a 0.2 mm thick stainless steel sheet (304SS) cleaned with 1,1,1-trichloroethylene. After the coated sheet was allowed to dry at a room temperature, it was cured at 230 degrees C. for two hours.

To evaluate the adhesion between the coating composition and stainless steel panel, the coatings were evaluated using the Tape Test Adhesion in accordance with ASTM D-3359 and the MEK Rub Test in accordance with ASTM D-4752-87. The results of this testing are presented in Table 13. To evaluate the adhesion and durability between the coating composition and the stainless steel panel in a coolant, the coatings, after immersion in a coolant (available commercially from The Penray Companies, Inc. as Pencool™ 3000-diluted with DI water and ethylene glycol at 1:16:16 ratio) at 105 degrees C. were subjected to the Tape Test Adhesion described above. The test results are shown in Table 13.

The stability of the fluoroelastomer coating compositions at room temperature was also evaluated. The number of days required for the coating compositions to gel are listed in Table 13.

Example 26

In Example 26, the sample was prepared and tested as in Example 25 except 10 g (32 mmhr) of Adhesion Promoter C was used for the Example. The test results are shown in Table 13.

Comparative Example M

In Comparative Example M, the sample was prepared and tested as in Example 25 except 6.9 g (32 mmhr) of Adhesion Promoter A (available from Witco as A-1100) was added to the coating solution instead of Adhesion Promoter C. The test results are shown in Table 13.

Example 27

In Example 27, the sample was prepared and tested as in Example 25 except 6.9 g Adhesion Promoter C was used and the polyhydroxy crosslinking agent was not mixed into the fluoroelastomer solution. The test results are shown in Table 13.

Comparative Example N

In Comparative Example N, the sample was prepared and tested as in Example 25 except Adhesion Promoter C was not used. The test results are shown in Table 13.

TABLE 13

| Example | Coating composition | | Tape test adhesion | | | | MEK Rub test | Time to gelation (day) |
|---|---|---|---|---|---|---|---|---|
| | Adhesion Promoter | Amount (mmhr) | Initial | 1 week | 3 weeks | 6 weeks | | |
| 25 | Adhesion Promoter C | 16 | 5B | 5B | 5B | 5B | 35 | 15 |
| 26 | Adhesion Promoter C | 32 | 5B | 5B | 5B | 5B | 40 | 12 |
| 27 | Adhesion Promoter C | 25 | 5B | 5B | 5B | 5B | 34 | 26 |
| M | Adhesion Promoter A | 32 | 5B | 5B | 5B | 5B | 30 | 5 |
| N | — | — | 5B | 1B | 0B | 0B | 2 | 32 |

Substantially improved adhesion to metal substrate can be obtained if an adhesion promoter is added to a fluoroelastomer coating solution. Proper selection of the adhesion promoter results in longer time to gelation.

The bonding composition can be used to coat metals such as gaskets.

Example 28

In Example 28, the fluoroelastomer coating solution was made by dissolving a 30% solid of fluoroelastomer A containing Compound IV (Table 2) in 2-butanone. A 9.2 g of Adhesion Promoter C in Table 5 and 3.8 g of ketimine, available from Shell Chemical as Pi-Cure® 3503, (believed to be diethylenetriamine/4-methyl-2-pentanone adduct) were mixed into the fluoroelastomer solution. The fluoroelastomer solution coated metal was prepared and tested as in Example 25 except PEAK®, available commercially from Northern Petrochemical Co, diluted with DI water by 50% was used as testing coolant. The test results are shown in Table 14.

Comparative Example O

In Comparative Example O, the sample was prepared and tested as in Example 28 except Fluoroelastomer C, which contains no olefin monomer, containing Compound VII in Table 2 was used instead of Compound IV. The test results are shown in Table 4.

TABLE 14

| | Coating composition | | Tape test adhesion | | | |
|---|---|---|---|---|---|---|
| Example | FKM | Olefin Monomer in FKM | Initial | 1 week | 3 weeks | 6 weeks |
| 28 | Fluoroelastomer A | Yes | 5B | 5B | 5B | 5B |
| O | Fluoroelastomer C | No | 5B | 0B | 0B | 0B |

An olefin monomer containing fluoroelastomer coating can improves coolant resistance and adhesion.

Example 29

In Example 29, the olefin monomer containing fluoroelastomer gum, BRE-7131 (available from Dyneon) was compounded on a two-roll mill using standard methods. Magnesium oxide was Elastomag 170 (available from Morton International), and carbon black was Thermax MT™, ASTM N990 (available from Cancarb). The compositions of the compounded gums are summarized in Table 3.

A sheet about 2 mm thick was formed from the Compound VIII in Table 3 by using a two-roll mill. A composite was made with a the sheet of the fluoroelastomer sheets and a 0.2 mm sheet of THV-500, available from Dyneon. The adhesion samples was prepared and tested as in Example 1. The test results are shown in Table 15.

Example 30

In Example 30, the sample was prepared and tested as in Example 29 except BRE-7231X, available from Dyneon LLC, was used as fluoroelastomer instead of BRE-7231X. The test results are shown in Table 15.

Example 31

In Example 31, the sample was prepared and tested as in Example 29 except a sheet of Fluorothermoplastic B in Table 4 (experimental material, melting point; 233° C.) was used instead of THV-500. The test results are shown in Table 15.

Comparative Example P

In Comparative Example P, a sample was prepared and tested as in Example 31 except FE-5830Q (Compound X), available from Dyneon, which is a terpolymer of TFE, HFP and VDF and doesn't contain an olefin monomer, was used instead of BRE-7231X. The test results are shown in Table 15.

TABLE 15

| | | Substrate B | | |
|---|---|---|---|---|
| Example | Substrate A | FKM (Compound #) | Olefin monomer in FKM | Peel strength (N/cm) |
| 29 | THV-500 | BRE-7131X (Compound VIII) | Yes | 15.4 |
| 30 | THV-500 | BRE-7231X (Compound IX) | Yes | 19.7 |
| 31 | Fluorothermoplastic B | BRE-7231X (Compound IX) | Yes | 30.9 |
| P | Fluorothermoplastic B | FE-5830Q (Compound X) | No | 0.4 |

Olefin monomer containing fluoroelastomers effectively bond to fluoroplastics.

Example 32

In Example 32, the fluorothermoplastic B in the Table 4 was extruded onto an extruded tube of the fluoroelastomer Compound XI having an outer diameter, available from Davis-Standard) at crosshead temperature of 265 degrees C. And then the fluorothermoplastic coated rubber tube was cooled and cut into curing samples. The samples were cured at 155 degrees C. for 60 minutes by steam in an autoclave with steel mandrill. The sample was removed from the autoclave and allowed to cool to room temperature. The Fluorothermoplastic B layer of the sample, outer layer, was carefully cut about 7 mm width to facilitate testing of the adhesion between the layers via a peel test. A Monsanto Tensometer 10 at 100 mm/min crosshead speed was used as test device. The test results are shown in Table 16.

Comparative Example Q

In Comparative Example Q, the sample was prepared and tested as in Example 32 except fluoroelastomer Compound XII, which contains no olefin monomer, was used as inside layer instead of fluoroelastomer Compound XI. The test results are shown in Table 16.

TABLE 16

| Example | Inside layer | | Outside layer | Peel strength (N/cm) |
|---|---|---|---|---|
| 32 | BRE-7231X | Yes | Fluorothermoplastic B | 35.7 |
| Q | FE-5830Q | No | Fluorothermoplastic B | 5.1 |

Olefin monomer containing fluoroelastomers effectively bond to fluoroplastics.

A number of embodiments have been described. Nevertheless, it will be understood that various modifications can be made without departing from the spirit and scope of the description. Accordingly, other embodiments are within the scope of the following claims.

What is claimed is:

1. A multi-layer article comprising:
a first polymer layer comprising a fluoropolymer;
a substrate; and
a bonding layer on a surface of the first polymer layer and in contact with the substrate, the bonding layer comprising a fluoroelastomer, wherein the fluoroelastomer comprises a monomer segment derived from an olefinic hydrocarbon and wherein the bonding lever includes an aldimine silane or ketimine silane.

2. The multi-layer article of claim 1, wherein the fluoroelastomer is a copolymer including tetrafluoroethylene.

3. The multi-layer article of claim 1, wherein the fluoroelastomer is a copolymer including vinylidene fluoride.

4. The multi-layer article of claim 1, wherein the fluoroelastomer is a copolymer including hexafluoropropylene.

5. The multi-layer article of claim 1, wherein the olefinic hydrocarbon is propylene.

6. The multi-layer article of claim 1, wherein the olefinic hydrocarbon is ethylene.

7. The multi-layer article of claim 1, wherein the substrate includes a non-fluorinated polymer.

8. The multi-layer article of claim 7, wherein the non-fluorinated polymer comprises a thermoplastic polymer.

9. The multi-layer article of claim 7, wherein the non-fluorinated polymer comprises a thermoplastic elastomer.

10. The multi-layer article of claim 7, wherein the non-fluorinated polymer is selected from the group consisting of nitrile rubbers, ethylene-propylene-diene monomer rubbers, epichlorohydrin rubbers, ethylene-acrylate copolymer rubbers, polyamides, polyurethanes, polyolefins, and combinations thereof.

11. The multi-layer article of claim 1, wherein the fluoropolymer is a fluoroplastic.

12. The multi-layer article of claim 1, wherein the substrate includes a metal.

13. The multi-layer article of claim 1, wherein the bonding layer includes an adhesion promoter.

14. The multi-layer article of claim 1, wherein the bonding layer includes an amino silane.

15. A process for preparing a multi-layer article comprising:
providing a first polymer layer comprising a fluoropolymer;
providing a substrate;
providing a bonding layer on a surface of the first polymer layer and in contact with the substrate, the bonding layer including a fluoroelastomer and an aldimine silane or ketimine silane; and
heating the first polymer layer, and the bonding layer.

16. The process of claim 15, wherein the fluoroelastomer is a copolymer derived from a monomer selected from the group consisting of tetrafluoroethylene, vinylidene fluoride, hexafluoropropylene and an olefinic hydrocarbon.

17. The process of claim 16, wherein the olefinic hydrocarbon is selected from the group consisting of ethylene and propylene.

18. The process of claim 15, wherein the substrate is selected from the group consisting of a non-fluorinated polymer or a metal.

19. The process of claim 18, wherein the non-fluorinated polymer is selected from the group consisting of nitrite rubbers, ethylene-propylene-diene monomer rubbers, epichlorohydrin rubbers, ethylene-acrylate copolymer rubbers, polyamides, polyurethanes, polyolefins, and combinations thereof.

20. The process of claim 15, wherein the bonding layer includes an adhesion promoter.

21. The process of claim 15, wherein the bonding layer includes an amino silane.

22. A multi-layer article comprising
a substrate having a first surface; and
a bonding composition comprising a fluoroelastomer in contact with said first surface,
wherein the bonding composition further comprises an adhesion promoter selected from the group consisting of an aldimine silane and a ketimine silane.

23. A multi-layer article according to claim 22, wherein the fluoroelastomer is a copolymer including an olefinic hydrocarbon.

* * * * *